United States Patent [19]
Allen

[11] Patent Number: 5,586,724
[45] Date of Patent: Dec. 24, 1996

[54] TAPERED PLUG FOAM SPRAY APPARATUS

[75] Inventor: Peter B. Allen, Slidell, La.

[73] Assignee: Lockheed Martin Corporation, Bethesda, Md.

[21] Appl. No.: 401,606

[22] Filed: Mar. 9, 1995

[51] Int. Cl.[6] ............................. B05B 7/04; B05B 15/02
[52] U.S. Cl. ..................... 239/112; 239/416.1; 239/427; 239/434; 222/145.5
[58] Field of Search ........................... 239/112, 412, 239/414, 415, 416.1, 427, 434, 543, 545; 222/129, 144.5, 145.2, 145.5, 145.7, 148

[56] References Cited

U.S. PATENT DOCUMENTS

| | | | |
|---|---|---|---|
| 3,030,982 | 4/1962 | Navara | 239/415 X |
| 3,122,326 | 2/1964 | Cook | 239/415 X |
| 3,708,123 | 1/1973 | Krueger | 239/415 |
| 4,202,497 | 5/1980 | Ten Pas | 239/112 |
| 4,263,166 | 4/1981 | Adams | 252/359 |
| 4,440,320 | 4/1984 | Wernicke | 222/145 |
| 4,708,292 | 11/1987 | Gammons | 239/414 |
| 4,867,346 | 9/1989 | Faye et al. | 222/145 |
| 4,898,327 | 2/1990 | Sperry et al. | 222/148 X |
| 4,913,317 | 8/1990 | Wernicke | 222/1 |
| 4,925,107 | 5/1990 | Brown | 239/414 |
| 5,163,584 | 11/1992 | Huber et al. | 222/1 |
| 5,170,939 | 12/1992 | Martin | 239/112 |
| 5,240,325 | 8/1993 | Monchiero | 222/145.5 X |

FOREIGN PATENT DOCUMENTS

2031758  4/1980  United Kingdom ................... 239/112

*Primary Examiner*—Kevin Weldon
*Attorney, Agent, or Firm*—William H. Meise

[57] ABSTRACT

A two-component foam spray gun is readily disassembled for cleaning. It includes a body (1) with reactant (12, 14) and purge gas (16) inlet ports. A moldable valve packing (32) inside the body has a tapered conical interior surface (142), and apertures which match the reactant ports. A valve/tip (40) has a conical outer surface (48) which mates with the valve packing (32). The valve/tip (40) is held in place by a moldable packing washer (34), held at non-constant pressure by a screw (36, 38). The interior of the valve/tip (40) houses a removable mixing chamber (50). The mixing chamber (50) has direct flow orifices (60) and an auxiliary flow path (58, 60) which ameliorate pressure surges. The spray gun can be disassembled for cleaning without disturbing the seal, by removing the valve/tip (40) to the rear, thereby breaking it free of the conical packing. Rotation of the valve/tip (40) relative to the body (1) shuts off the reactant flow, and starts the purge gas flow.

6 Claims, 7 Drawing Sheets

TAPERED PLUG FOAM SPRAY APPARATUS

STATEMENT OF GOVERNMENT RIGHTS

The invention described herein was made in the performance of work under NASA Contract No. NAS 8-36200, and is subject to the provisions of Section 305 of the National Aeronautics and Space Act of 1958, as amended (42 U.S.C. 2457).

FIELD OF THE INVENTION

This invention relates to delivery devices or spray guns for dispensing multicomponent foam material, and more particularly to such devices which provide on-off operation and purging by rotation of a single valve.

BACKGROUND OF THE INVENTION

Multicomponent reactant materials are widely used in manufacturing. Some of these reactant materials must be contacted shortly before application, because of the speed of the reaction. Among these materials are those making polyurethane foam, and elastomeric coatings, resin formulations, and the like, as described in U.S. Pat. Nos. 4,867,346, issued Sep. 9, 1989, and 5,170,939, issued Dec. 15, 1992 in the name of Martin.

A reactant component of some foam formulations tends to harden even in the absence of the other component or a catalyst, and the presence of even a minuscule amount of the other reactant material at one end of a quantity of the hardenable component will result in progressive hardening of the entire hardenable mass. The problems of spraying such materials is compounded by the high pressures, which can range up to 3000 pounds per square inch (PSI), necessary to cause flow of the reactant materials, and to forcefully eject the reacted material from the spray nozzle. U.S. Pat. No. 4,913,317, issued Apr. 3, 1990, in the name of Wernicke, is directed, in part, toward the problem of multicomponent foam tending to harden even in the absence of a catalyst or second reactant material, and includes first and second mechanically synchronized rotary valves, each of which is coupled to a source of one of the reactants and a source of purging gas, and which, when rotated, pass either the reactant component or the purging gas to a mixing chamber. The two valves of this arrangement are difficult to synchronize so as to start and stop the flow of reactant material to the mixing or reacting chamber and nozzle.

The synchronization problem of the Wernicke arrangement is solved by a ball valve spray gun as described in the above-mentioned Martin patent. The Martin arrangement uses a rotary ball valve having a port for each component, and containing a wye (Y) at which the two reactant materials meet. Rotation of the ball simultaneously moves both reactant ports of the ball, which, with proper alignment of the ball with its associated source apertures, necessarily results in synchronous operation.

Another of the problems associated with spray guns for multicomponent reactant materials is that of disassembly for cleaning. Even with a gas purge, some reacted material will inevitably adhere to internal portions of the dispensing apparatus or spray gun, and such material will build up with time, and interfere with operation. This interference may be in the form of changing the spray pattern, and may occur relatively frequently. This problem is addressed in the prior art by using tetrafluoroethylene (TEFLON) or other low-adherence material. However, buildup of reacted material still occurs, even with the best of materials, so frequent cleaning of the interior of the spray gun is required. The Martin ball valve arrangement requires disassembly of the ball from its complex seats, which include metallic rings. The metallic rings prevent excessive cold-flow of the tetrafluoroethylene under the high pressure, since portions of the tetrafluoroethylene seat might flow into the ports, and be shaved off when the valve is rotated. U.S. Pat. No. 4,867, 346, issued Sep. 19, 1989 in the name of Faye et al., discusses this disadvantage of the use of tetrafluoroethylene for high-pressure applications in the context of a valve rod.

Simplified disassembly for cleaning is a feature of the foam spray gun described in U.S. Pat. No. 4,708,292, issued Nov. 24, 1987 in the name of Gammons. In the Gammons arrangement, an easily removable and replaceable combination mixing-chamber and nozzle, formed from an inexpensive, deformable, low friction material, is held by pressure against ports which admit the reactant materials, and flow of the materials is controlled by a valve rod extending within the mixing chamber of the combination mixing-chamber and nozzle. This arrangement has the disadvantage that, when the flow is stopped by the valve rod, the reactant material in each port has been in contact with the other reactant, and may harden. This portion of the material may not be accessible for cleaning by removal of the mixing-chamber/nozzle. The valve stem is also required to conform to the internal shape all the way into the spray tip, otherwise the reactive spray materials will harden, thereby causing resistance to repeated operations, and blocking the tip orifice.

An improved spray gun apparatus is desired.

SUMMARY OF THE INVENTION

A two-component foam spray gun or device includes a housing with a tapered packing or valve bearing, which is preferably made from graphite-fiber reinforced tetrafluoroethane or tetrafluoroethylene (TEFLON). The valve packing includes apertures which align with inlet ports in the body for the A and B foam components, and with at least one purging gas port. The valve packing is held fixed relative to the body of the spray gun. According to an aspect of the invention, a tapered plug valving arrangement fits within the tapered portion of the valve packing, and is rotatable relative thereto, to either bring the A and B component ports into line with its apertures so that the two components can flow into the tapered plug, or to bring one or more of the gas ports into line with the apertures in the tapered plug, to thereby admit purging gas. According to another aspect of the invention, the two components of the foam are introduced into a removable mixing chamber within the tapered plug, by means of an annular channel and a plurality of apertures about the channel, which coact to smooth the flow of foam in the presence of pressure variations in the reactant material flows. A salient advantage of the apparatus according to the invention is that the valve and tip may be removed for cleaning without disturbing the valve packing, so that, when reassembled, leakage does not occur despite the high pressures with which the foam components are introduced.

DESCRIPTION OF THE INVENTION

Figure 1A:
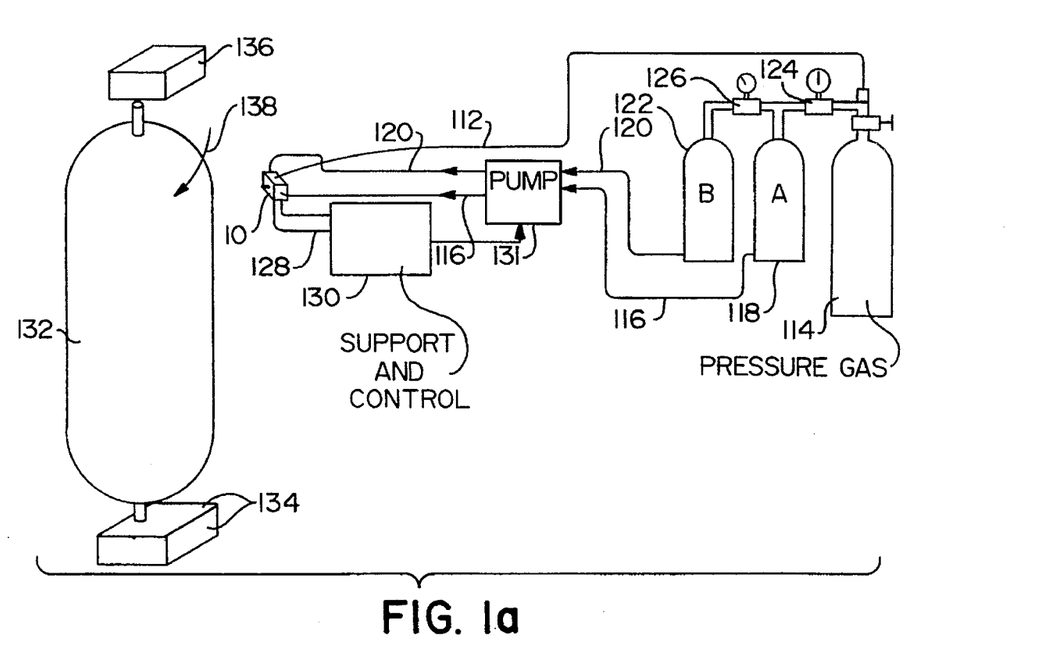
FIG. 1a is a simplified representation of a spray gun according to the invention, operating to spray foam onto a workpiece in the form of a tank.

FIG. 1a illustrates a foam spraying apparatus. In FIG. 1a, a two-component foam spray head 10 is fed with purging gas by way of a gas path, tube or pipe 112 from a tank 114 of compressed purging gas. The gas may be air, or it may be nitrogen or other inert gas. Spray gun 10 also receives the A and B foam components over paths 116 and 120, respectively, from a ratio-controlled pump 131. Pump 131 pumps the A an B foam components in a predetermined ratio which provides the desired properties of the hardened foam. Pump 131 receives the foam components from tanks 118 and 122, which are pressurized by gas from tank 114 by way of pressure regulators illustrated as 124 and 126. In a particular embodiment of the invention, this was a Gusmer H4 pump, available from Gusmer, One Gusmer Drive, P. O. Box 110, Lakewood, N.J. 08701, phone (908) 370-9000.

Figure 1B:
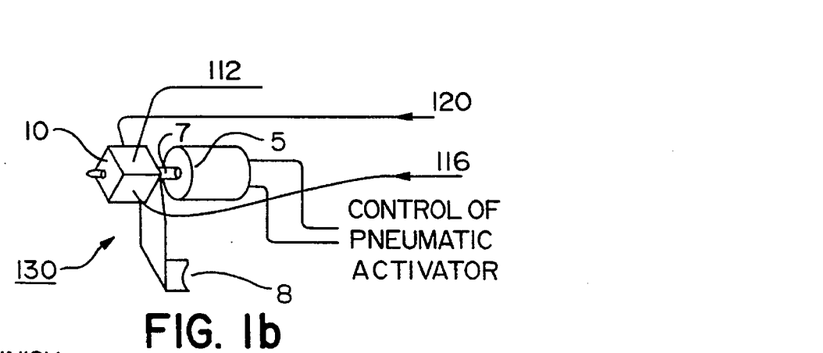
FIG. 1b is a simplified representation of control of a spray gun according to the invention by means of a pneumatic actuator.
Figure 1C:
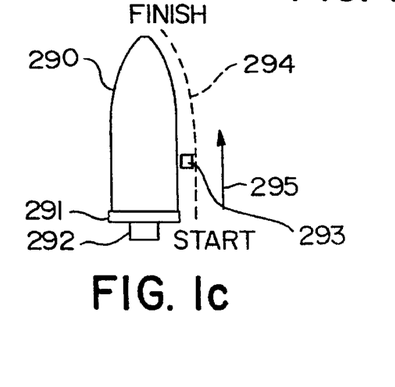
FIG. 1c is a simplified representation of the path taken by the spray head according to the invention when spraying a tapered portion of the tank.
Figure 1D:
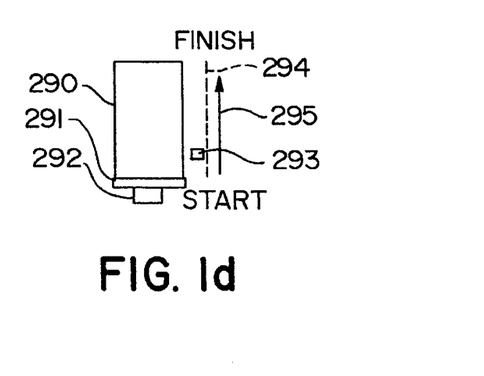
FIG. 1d is a simplified representation of the path taken by the spray head according to the invention when spraying a cylindrical portion of the tank.

Also illustrated in FIG. 1a is a workpiece in the form of a tank 132, the exterior of which is to be coated with a uniform coating of reacted foam. Tank 132 is supported and rotated in the direction of arrow 138 by a support and rotation apparatus illustrated as blocks 134 and 136. Sprayer 10 is mounted on a support illustrated as 128, which is moved up and down during spraying in order to completely coat the rotating workpiece. FIG. 1b is a simplified representation of some details of the support and control arrangement 128, 130 of FIG. 1a. In FIG. 1b, the support and control 130 includes a pneumatic control actuator 5 is coupled to spray head 10 by means of a drive tongue 7, and also includes a support and carriage 8. FIG. 1c illustrates a conical or tapered portion of a tank 290 mounted on a turntable 291 rotated by a drive motor 292. A spray-gun actuator 293 starts at the bottom of a curved path 294 indicated by a dash line, and travels upward in the direction of arrow 295, spraying while the workpiece 290 rotates. FIG. 1d is similar to FIG. 1c, but a cylindrical tank portion 290 is illustrated.

Figure 2:
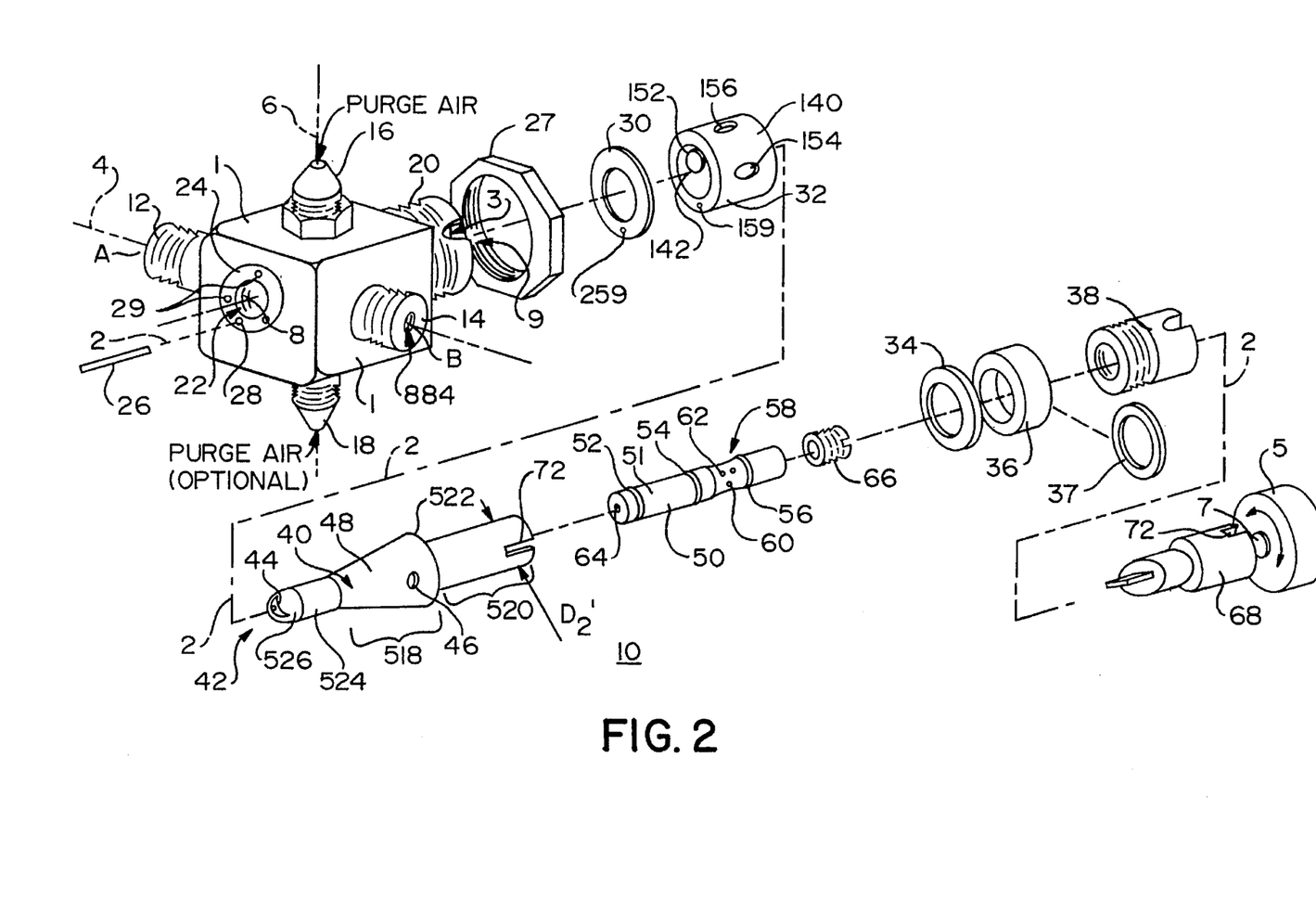
FIG. 2 is a perspective or isometric view of the spray gun of FIG. 1, simplified, and exploded to illustrate how the parts, including a body, valve and tip portion, valve bearing or packing, packing washer, thrust washer and threaded packing ring compressor fit together, and with some portions partially cut away to reveal interior details.
Figure 8:
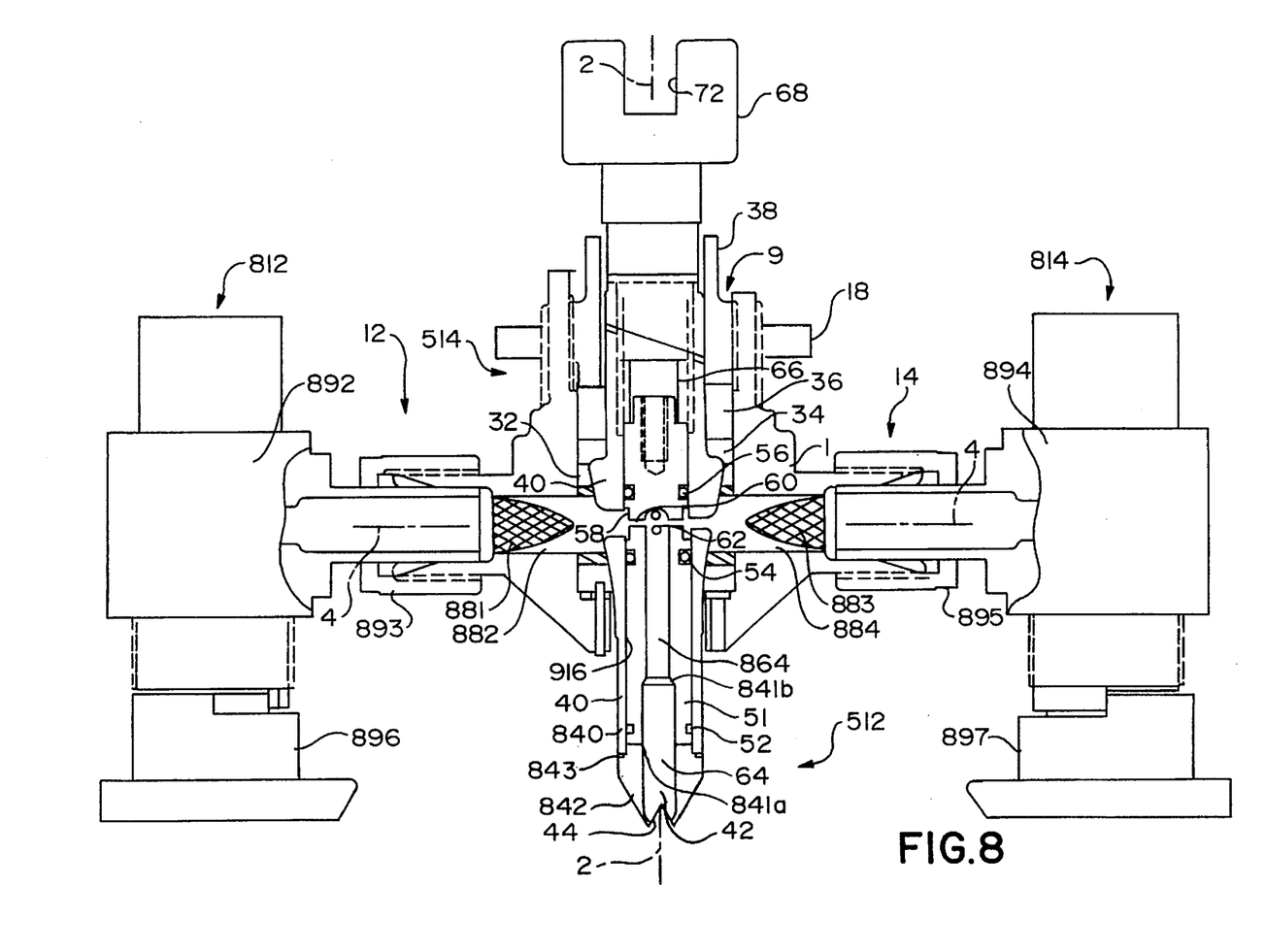
FIG. 8 is a cross-sectional view including the arrangement of FIG. 2, showing the body, valve and tip portion with multistepped bore, valve bearing or packing, hold-out inserts, packing washer, thrust washer, and threaded packing ring compressor in their assembled form, affixed to the ports for filtering the reactants flowing to the spray gun, and in a first rotational position in which reactant fluids may flow.
Figure 9:
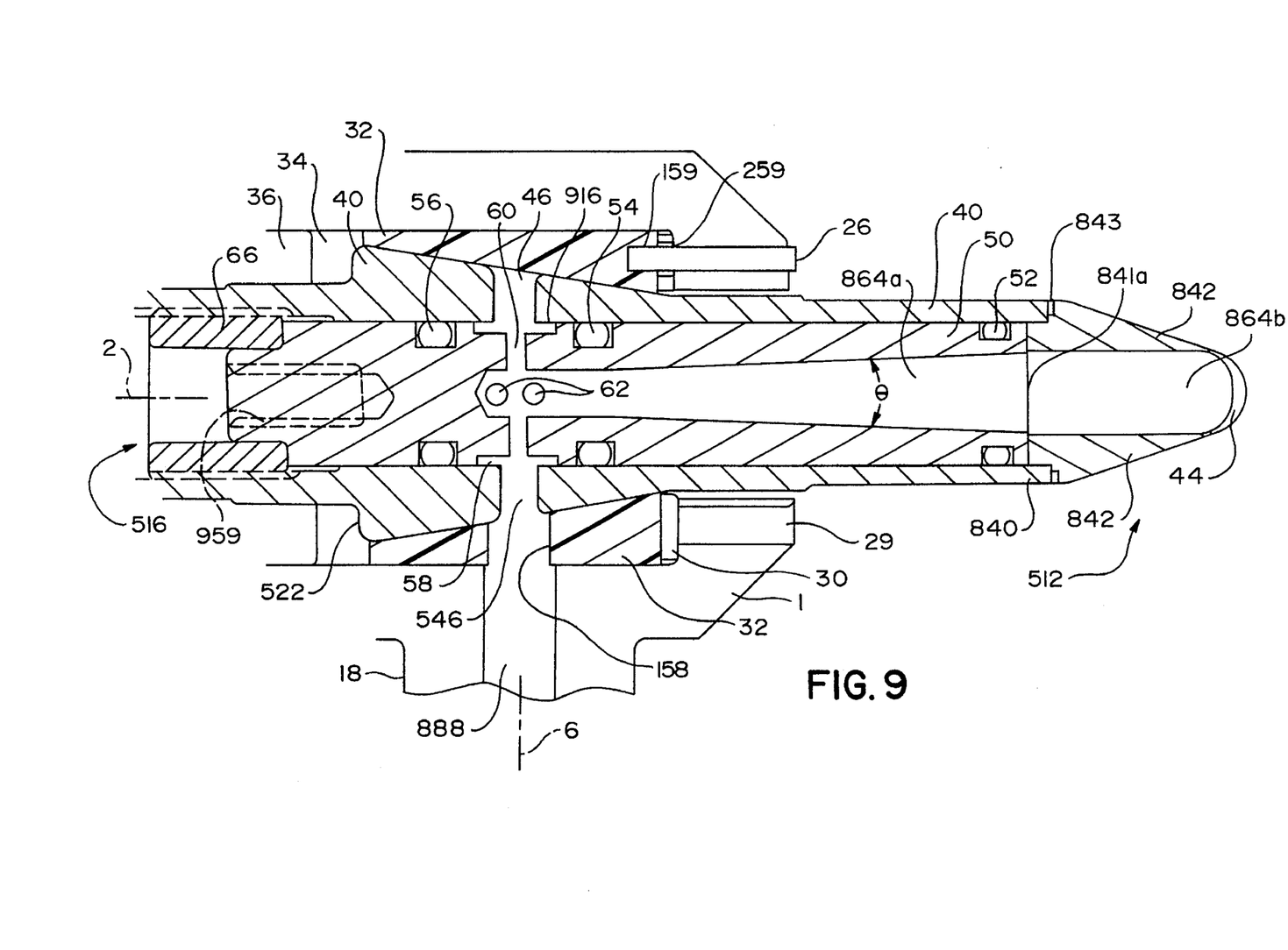
FIG. 9 is a cross-sectional view illustrating details of a portion of an arrangement similar to that of FIG. 8, but having a single-step bore and lacking hold-out inserts, with the valve in a second rotational position suitable for purging.

FIG. 2 is an exploded view of spray gun head 10 of FIG. 1a, FIG. 8 is a cross-section, a portion of which illustrates the arrangement of FIG. 2 in its assembled form with a multistepped bore, and FIG. 9 is a cross-section, a portion of which illustrates the arrangement of FIG. 2 in its assembled form with a single-step bore. In FIG. 1a, a spray gun body 1 has a through cavity 3 opens at the near or "front" end as a circular aperture 22, and at the far end, not completely visible in FIG. 1a, as an assembly aperture 9. Body cavity 3 has an interior surface 8, and is centered about a principal or longitudinal axis 2, and aperture 22 is also centered thereabout. Body 1 of spray gun 10 defines four ports, namely ports 12, 14, 16, and 18, all of which are illustrated as being associated with male threaded nipples to which corresponding female pipe or tube fittings can be attached. Ports 12 and 14 have bores 882 and 884 which are coaxial with a second body axis 4, which second body axis is transverse to the principal or longitudinal axis 2, and which intersects axis 2. Ports 12 and 14 are for the reception of the two component liquids of the foam, which spontaneously react on contact, and harden quickly into foam. While the spray gun is symmetric, and either reacting component may be applied to either port, for definiteness, port 12 is labeled "A" to indicate reception of the A component, and port 14 is labeled "B".

A second set of ports 16, 18 is associated with body 1 of FIG. 1a, to admit purging air or other gas. The bore of port 16 is not illustrated, and the bore of port 18 is illustrated as 888 in FIG. 9. The bores of ports 16 and 18 are coaxial with a third axis 6, which intersects with, and is orthogonal to, both axes 2 and 4. Thus, axes 2, 4, and 6 intersect at a point within body 1, and all four ports 12, 14, 16, and 18 are centered on a single plane, termed a "port plane", which is defined by axes 4 and 6.

Body 1 also includes an externally threaded portion 20 which projects away from the viewer, or "rearward", from the port plane. The threaded exterior 20 may be used, if desired, in conjunction with an external mounting nut 27 matching threads 20, to aid in mounting the spray gun 10 onto support and actuator 128 of FIG. 1a, but any mounting method may be used. The illustrated mounting is advantageous for a foam spray gun which is mounted on an automatic controller, as in the case of FIG. 1a, because the operative portions of the spray gun can be removed from the rear for cleaning, as described in more detail below, without dismounting the spray gun actuator 5 from the support.

A metal washer 30 in FIG. 2 is dimensioned to fit within cavity 3 of body 1 through the assembly aperture 9. The purpose of washer 30 is to aid in later removal, if desired, of the valve bearing or packing described in more detail below. Washer 30 may be accessed from the front of body 1 by means of packing removal pin punch tool (not illustrated)

which may be inserted into packing removal holes 29, which can then be pressed on to bear on washer 30 to force it, and packing which may be behind it, out of the body. As illustrated in FIG. 2, metal washer 30 has an index pin clearance aperture 259 which is aligned with an index pin aperture 28 in body 1, both of which are dimensioned to admit an index pin 26. An annular packing or valve bearing is illustrated as 32 in FIG. 2, and is also illustrated in more detail in FIGS. 4a and 4b. Body 1 defines a cavity 3 which extends to a front aperture 22, which is surrounded by a machined surface 24. The interior surface of cavity 3 is illustrated as 8 in FIG. 2.

Figure 4A:
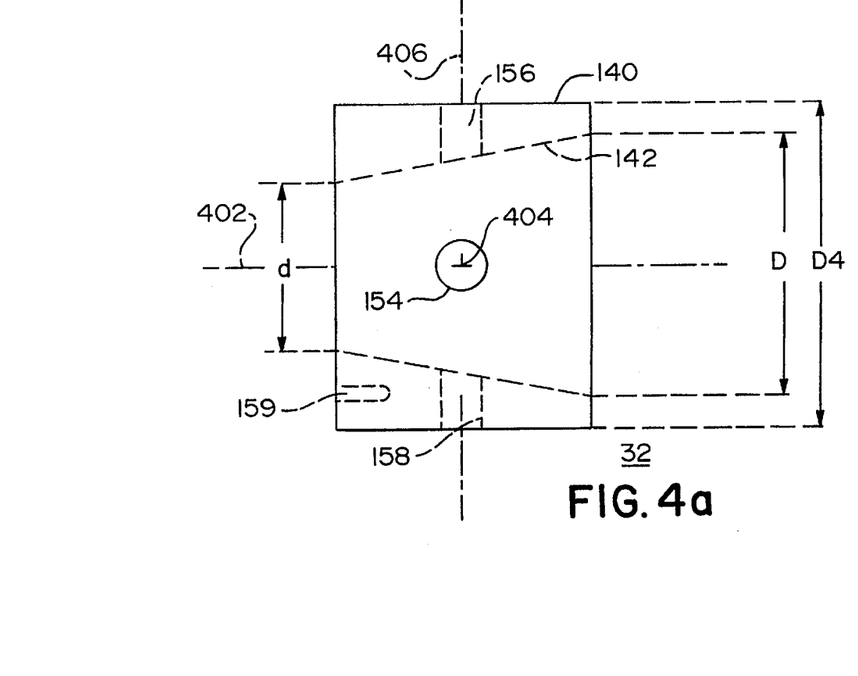
FIGS. 4a and 4b are side elevation and end views, respectively, of the valve packing or valve bearing portion of the arrangement of FIG. 2, illustrating the tapered interior surface and the locations of the fluid flow apertures.
Figure 4B:
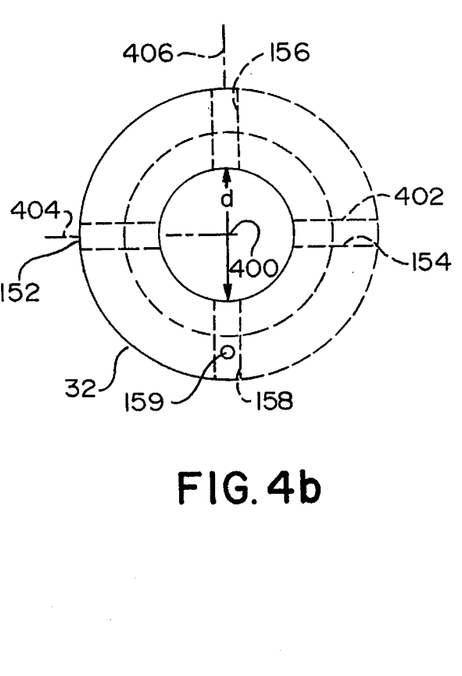

The outer surface 140 of valve packing or bearing 32 of FIG. 2 is cylindrical, as illustrated in more detail in FIGS. 4a and 4b, so that it may easily be fitted or slipped into cavity 3 in body 1 (FIG. 2). Valve packing 32 of FIGS. 4a and 4b has a cylindrical inner surface 142 centered on a principal axis 402 which, when the spray gun is assembled, is coincident with spray gun principal axis 2 of FIG. 2. Cylindrical inner surface 142 tapers linearly from a small diameter d at the left end as illustrated in FIG. 4a, which corresponds to the "front" or near end of the spray gun as illustrated in FIG. 2, to a larger diameter D at the rear end. Valve packing 32 as illustrated in FIGS. 4a and 4b also has four radial apertures which extend through the annular wall. Radial apertures 152 and 154 are coaxial with an axis 404, which is orthogonal to and intersects axis 402, and apertures 156 and 158 are coaxial with an axis 406, which is orthogonal to, and intersects, both axes 402 and 404. When valve packing 32 is mounted within body 1, valve packing axes 402, 404, and 406 are coincident with spray gun axes 2, 4, and 6, respectively; when so oriented, valve packing apertures 152, 154, 156, and 158 align with body ports 12, 14, 16, and 18, respectively. An indexing aperture 159 in the front of valve packing 32 accepts indexing pin 26 of FIG. 2, to prevent rotation of valve packing 32 relative to body 1. Valve bearing or packing 32 is made from a material which is moldable or deformable under pressure. Tetrafluoroethylene or tetrafluoroethane (TEFLON) is moldable and has the additional advantage of low friction when used in moving parts, but for very high pressures may flow excessively. A preferred material for valve packing 32 is a fluorocarbon such as TEFLON, impregnated with 25% of a fibrous reinforcement such as graphite, which is itself a low-friction material. This combination material was custom-made for the inventors by ACCRD SEAL, Vicksburg, Miss., phone no. (616) 649-1014.

Figure 5A:
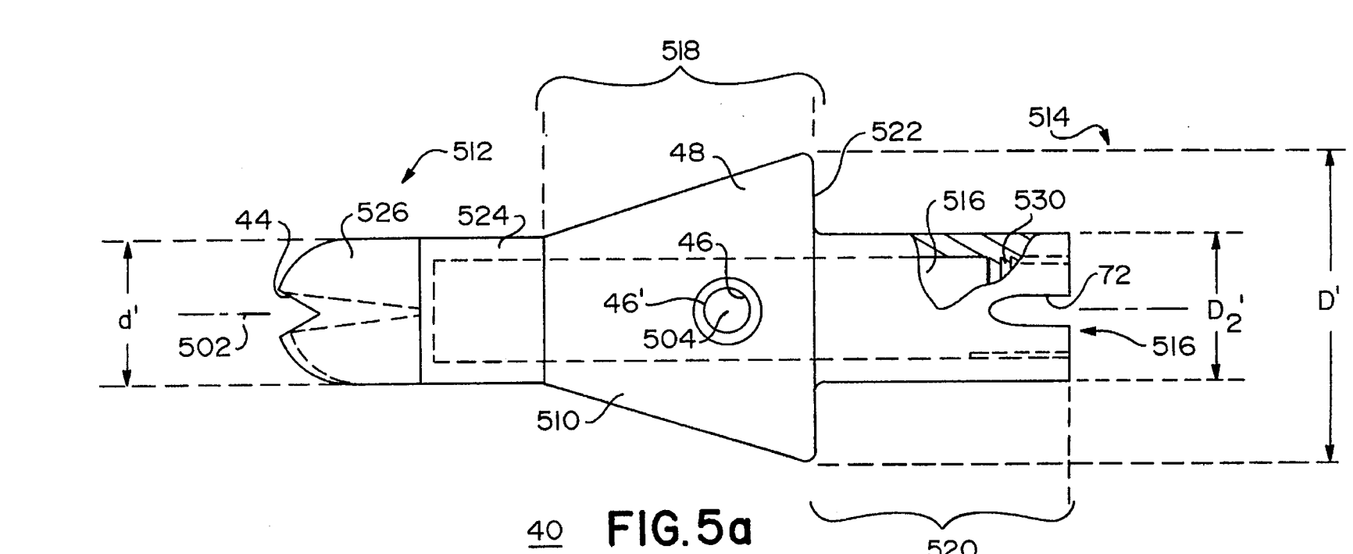
FIGS. 5a, 5b, and 5c are side elevation, rear perspective or isometric, and end views, respectively, of a valve and tip portion of the arrangement of FIG. 2.
Figure 5B:
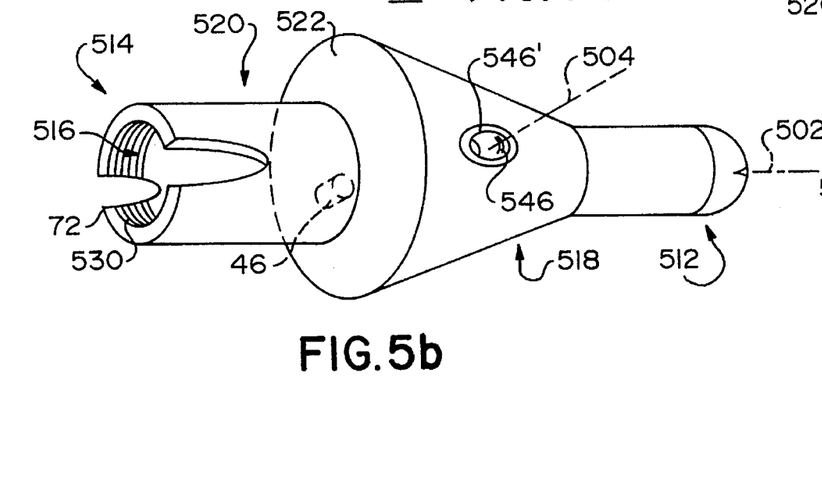
Figure 5C:
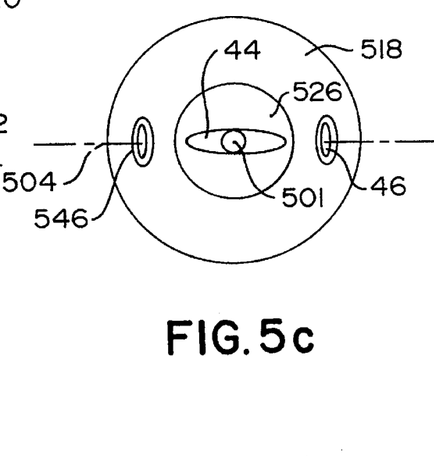

A valve and tip piece 40 is illustrated in its relative position in FIG. 2, and is illustrated in more detail in FIGS. 5a, 5b, and 5c. As illustrated, valve and tip piece 40 includes a first portion 518 which is in the form of a frustum 48 of a cone, and a second portion 520 to the rear (toward end 514) of valve and tip piece 40. The outer diameter of second portion 520 is designated $D'_2$. The transition between the cone 48 and cylindrical second portion 520 of valve and tip piece 40 is made by a flat radial bearing surface 522. A tip portion of valve and tip piece 40 includes a cylindrical portion 524, and a curved or rounded portion 526. The front or dispensing end 512 of rounded portion 526 has a horizontal slot 44, best seen in FIG. 5c, which tends to result in a vertically disposed fan spray pattern. A cavity 516, having various diameters along its length, as described in more detail below, extends within valve and tip piece 40 from an aperture at the rear end 514 thereof, illustrated in FIG. 5b to dispensing end slot aperture 44. That portion of cavity 516 adjacent the rear end 514 of the second portion 520 of the valve and tip piece 40 has internal threads 530. A slot designated 72 extends through the walls of valve and tip piece 40 at its rear end 514, for accommodating tongue 7, described above, which may be rotationally driven by 90° rotational actuator 5 to rotate the valve and tip portion 40 relative to the valve packing 32. Valve and tip piece 40 may be made from a metal which is not corroded by the foam reactant materials.

Conical portion 48 of first portion 518 of valve and tip piece 40 of FIGS. 5a, 5b, and 5c fits into the tapered portion of valve packing 32, as illustrated by FIGS. 8 and 9, and as suggested in FIG. 2. Cone 48 of valve and tip piece 40 tapers from a smaller diameter d' near the front end (that end closer to end 512), to a larger diameter D' near the rear. Dimension d' valve and tip piece 40 is equal to dimension d of valve packing 32, and dimension D' of valve and tip piece 40 equals dimension D of valve packing 32. The taper of valve and tip piece 40 matches that of the valve packing 32 (FIGS. 4a & 4b), so that when the two are mated, a conforming, sealing fit occurs. Rotation of valve and tip piece 40 within valve packing 32 allows apertures 46 and 546 of valve and tip piece 40 to be either (a) aligned with apertures 152 and 154 and misaligned with apertures 156 and 158 of valve packing 32, or (b) to be aligned with apertures 156 and 158 and misaligned with apertures 152 and 154 of valve packing 32. Keeping in mind that the four apertures of valve packing 32 are fixedly aligned with the reactant inlet and purge ports of body 1, it will be clear that rotation of valve and tip piece 40 within valve packing 32 allows either the reactant fluids or the purging gas, but not both simultaneously, to enter cavity 516 in the valve and tip piece 40. The outer edges of apertures 46 and 546 of valve and tip piece 40 include chamfers 46' and 546', to prevent cutting or shaving of the packing by rotation of the valve tip 40.

Apertures 46 and 546 of FIGS. 5a, 5b, 5c, and 9 are dimensioned for the characteristics of their respective A and B reactant fluids. The size of each aperture depends upon the volume or weight ratio of the reactant fluids, and upon their viscosities at the operating temperature, for a similar pumping pressure. This has the advantage of maintaining substantially equal pumping pressures, while tending to prevent "crossover" of reactant from one port to the other when the spraying operating begins. It has been found that pressure balance within 200 pounds per square inch (PSI) at 1000 PSI operating pressure is satisfactory.

A mixing chamber piece or insert 50 fits within valve and tip piece 40, as suggested by FIG. 2, and as described in more detail below. Mixing chamber insert 50 is held in place within valve and tip piece 40 by an externally threaded screw 66.

Figure 6:
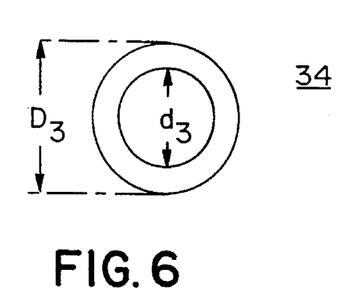
FIG. 6 illustrates packing washer dimensions.
Figure 7:
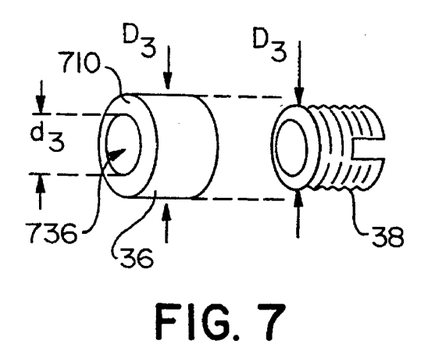
FIG. 7 illustrates a thrust washer and annular plug which apply pressure to the packing washer of FIG. 6.

A packing washer 34, preferably made from unreinforced TEFLON, fits over second portion 520 of valve and tip arrangement 40, and against flat radial bearing face 522 in FIG. 2. Packing washer has an outer diameter of $D_3$ and an inner diameter of $d_3$, as illustrated in FIG. 6. Dimension $d_3$ is selected to fit over second portion 520 of valve and tip piece 40, and dimension $D_3$ is selected to fit snugly within a corresponding portion (not illustrated in FIG. 2) of cavity 3 of body 1. Packing washer 34 is held in place at sufficient pressure to cause a slight extrusion, and to make a secondary seal, by a thrust washer 36 and a threaded packing tightness adjustment screw 38 of FIG. 2, which screws into a correspondingly threaded portion of body 1. Details of thrust washer 36 and threaded packing tightness adjustment screw 38 are illustrated in FIG. 7.

In a preferred embodiment of the invention, a three-component "universal loading spring", illustrated as 37 in FIG. 2, is inserted between thrust washer 36 and threaded ring 38. This spring is made by Universal Loading Spring Corporation, 2131 Sunnydale Blvd., Clearwater, Fla. 34625.

Referring again to FIG. 2, a rotary mechanical coupling plug 68 has a tongue 70 which mates with slot 72 of valve and tip piece 40, for rotating the valve and tip piece and the mixing chamber insert 50 assembled therewith relative to body 1 and valve packing 32. A 90° rotation of valve and tip piece 40 in this fashion (from the "OFF" position), (a) aligns the valve and tip piece orifices 46, 546 with the bores 882 and 884 of the reactant ports 12 and 14, respectively, and misaligns the valve and tip piece orifices 46, 546 with the purge ports, and a 90° rotation is the reverse direction (back to the "OFF" position), (b) aligns the valve and tip piece orifices 46, 546 with the bores, one of which is designated 888, of the purge ports, and misaligns the valve and tip piece orifices 46, 546 with the bores 882 and 884 of the reactant ports 12 and 14. Thus, rotation of coupling 68 alternately applies purge gas and reactants to the ports, so that the reactant flow can be turned on and off, and the purge gas enters almost instantaneously when the reactant flow ends. This allows the reactant materials to be purged before they have a chance to harden. Rotation of coupling 68 is accomplished by actuation of 90° actuator 5, which drives tongue 7, which mates with slot 72 in coupling 68.

Figure 3:
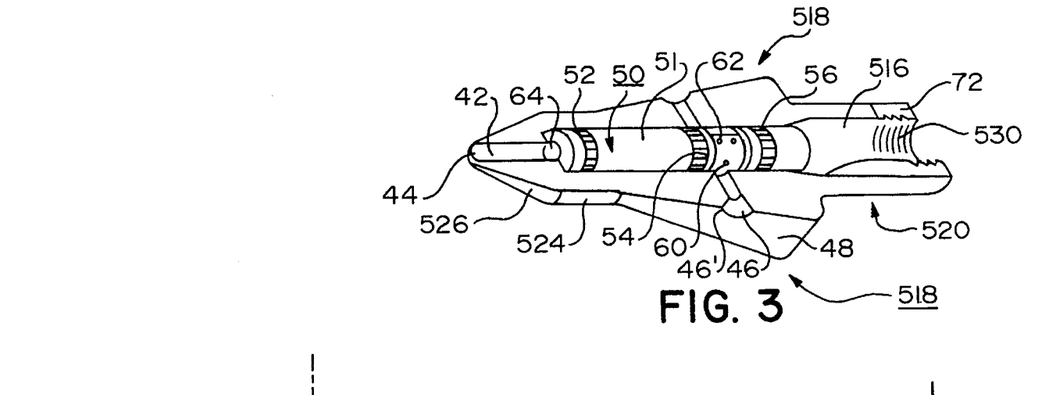
FIG. 3 is a perspective or isometric view of a portion of the spray gun of FIG. 2 in assembled form, partially cut away to reveal interior details.

Mixing chamber piece or insert 50 fits within valve and tip piece 40, as suggested by FIG. 2, and as illustrated by FIGS. 3, 8, and 9, and butts against an internal wall 841a thereof. Referring to FIG. 2, mixing chamber insert 50 is in the general form of a metallic cylinder 51 which is centered on axis 2, and has a central bore 64. Mixing chamber insert 50 has an annular depression or flow diverter 58 in its outer surface, which, when assembled, lies in the port plane. A pair of 0-rings 54 and 56 on either side of annular depression 58 isolates depression 58 from the adjacent exterior surfaces of mixing chamber insert 50. Another 0-ring 52 provides further isolation, to prevent reacted material from insinuating itself, and hardening, between the exterior of mixing chamber insert 50 and the interior surface of valve and tip piece 40, and thereby making disassembly difficult. As mentioned, screw 66 screws into threads 530 in the rear of valve and tip piece 40 (FIG. 5b) to retain mixing chamber insert 50 in position inside the valve and tip assembly 40.

Referring to FIGS. 8 and 9, valve and tip piece 40 can be seen to be assembled from two portions, which are a main portion 840 and a tip portion 842, which are brazed together along an annular region 843. In another embodiment, the tip portion was inserted into the valve and retained by a step in the bore, which allowed rotation/setting of the orifice and replacement. In both cases, a step is formed in the bore. The dimensions of the bores of the main portion 840 and the spray tip portion 842 are such that a step 841a occurs at the junction of bore 864a of main portion 840 and the bore 864b of tip portion 842. Step 841a has been found to aid in preventing attachment and build-up of reacted foam material near the tip, possibly because the larger diameter of the tip portion results in a "decoupling" of the flowing reacting material from the walls of the bore at the step. The arrangement of FIG. 8 includes a second step 841b, which aids in reducing attachment and affords an expanding flow into the spray tip, and also improves the fan spray distribution.

FIG. 8 also illustrates cross-sectional views of hold-out inserts which may surround each of the ports in packing 32, to aid in preventing extrusion of the packing material. These hold-out inserts are in the form of tapered-width rings which surround each port, and which bear against the inside surface of cavity 3 in body 1 and have a slight clearance with the metal body of valve & tip 40. This prevents reduction of the sealing effect of the packing material at higher pressures. They are used to stabilize the packing and allow it to be reused, and to prevent it from moving slightly each time it is reassembled, as otherwise the port apertures might become smaller due to "flowing" of the packing material. They are also useful in preventing extrusion of nonreinforced TEFLON packing up to 1500 PSI. The carbon fiber reinforcement is used at pressures up to 3000 PSI or more. When graphite-fiber reinforced packing 32 is used, relatively large clearance is allowed between valve and tip 40 and the hold-out inserts and also between the body and the packing removal ring 30.

FIG. 8 also illustrates a pair of reactant filters 881 and 883 fitted within bores 882 and 884, respectively. These filters can be accessed for cleaning or replacement by removal of nuts 893 and 895, respectively, associated with ports 12 and 14, respectively. Port 12 of the arrangement of FIG. 8 is illustrated as being associated with a reactant flow control valve 892, controllable by a knob 896. Similarly, port 14 of the arrangement of FIG. 8 is illustrated as being associated with a reactant flow control valve 894, controllable by a knob 897. Reactant material flows into ports 812 and 814 of valves 892 and 894, respectively, in the arrangement of FIG. 8.

As illustrated in FIG. 9, the bore (864a and 864b) of mixing chamber insert 50 tapers, with an approximate total included angle θ=3½°. This angle has been found to be provide an expanding flow and afford an improved fan pattern distribution, but is only suitable for short duration sprays (five to ten minutes) as the material tends to attach to the walls more than in the case of the multistepped structure of FIG. 8. A greater included angle of 8° aids in preventing attachment, but the stepped structure is superior. The rear end of mixing chamber insert 50, which is the end remote from dispensing end 512, has a threaded hole, designated 959 in FIG. 9. This threaded hole is useful for insertion of a forcing screw during disassembly of the mixing chamber insert 50 from valve and tip piece 40.

When the rotational position of the valve and tip piece 40 is set to admit reactant materials, as illustrated in FIG. 8, the reactant materials flow to the interior bore portion 864 of bore 64 by way of a pair of direct communication passages or apertures 60, and also flow into the interior bore portion 864 of bore 64 by way of an auxiliary path including (1) the annular passage defined between (a) the inner surface 916 of cavity 516 in valve and tip piece 40 and (b) depression 58 in the outer surface of mixing chamber insert 50, and (2) mixing orifices 62. The auxiliary path is longer than the direct path, with the result that any slight pressure variations in the reactants applied to the input ports are applied immediately to the direct paths, to result in an increase in flow, and with a delay to the mixing orifices 62 in the auxiliary paths, so that a step or pulse pressure change results in a reactant flow which is more distributed over time.

Figure 10:
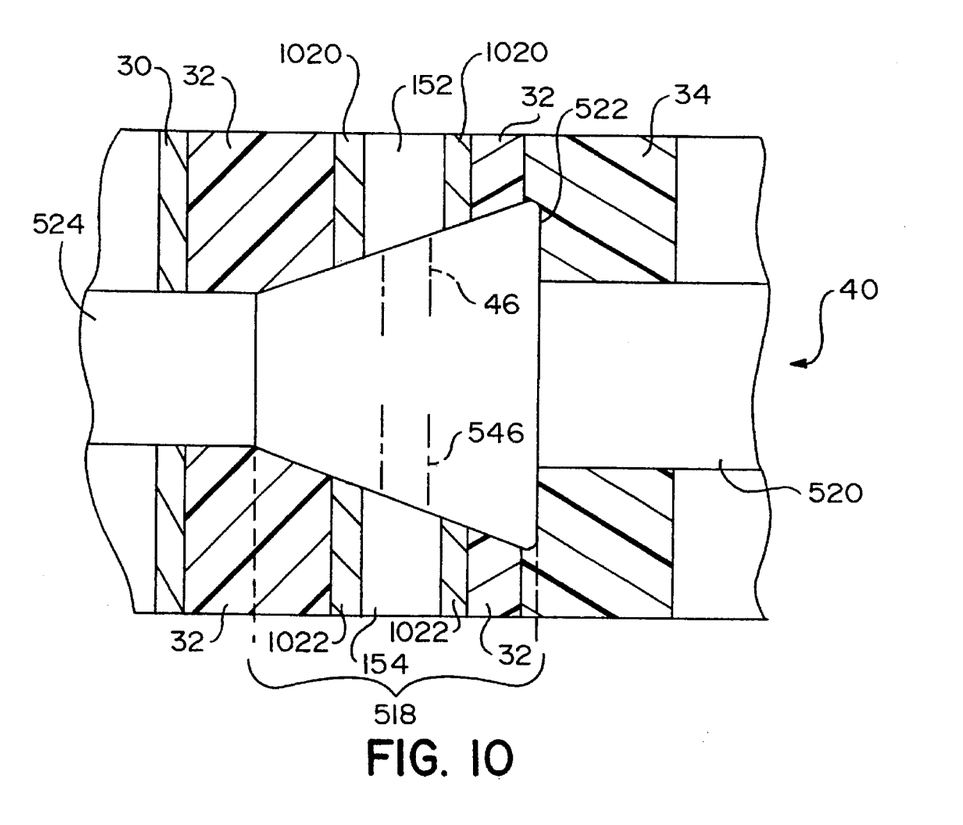
FIG. 10 is a cross-section of a portion of a valve according to the invention, illustrating hold-out inserts.

Hold-out inserts may be included for use at higher pressures and/or multiple re-torquing or re-use of the valve in the packing. FIG. 10 illustrates a portion of a valve according to the invention, including a tapered metal ring 1020 associated with reactant aperture 46, and a similar ring 1022 associates with aperture 546. These rings fit into apertures 152 and 154 of packing 32

When the spray gun is initially assembled, sufficient pressure is applied to packing tightness adjustment screw 38 to cause some slight flow of packing washer 34, so that it seats properly against bearing surface 522, to reduce reactant flow along the outer surface of second portion 520 of valve and tip piece 40 toward the rear of the spray gun. Because of the reinforcement of the material of valve packing 32, there is less flow of the valve seal, with the result that there is a reduction in the amount of material which flows into the valve and tip piece 40 orifices 46 and 546, and consequently less likelihood than in the prior art of cutting off of protruding portions of the sealing material during rotational operation of the valve. The correct amount of material flow of the valve packing 32 and packing washer 34 is established by applying full pressure to the reactant ports with the valve rotated to the off position (air pressure can be used for this test to prevent leakage of reactants), and tightening the packing tightness adjusting screw 38 until both (a) flow to the rear along the outer surface of valve and tip piece 40, and (b) leakage through the valve, are reduced to the desired amount. Unlike prior-art arrangements in which springs or Belleville washers are interposed between the packing tightness screw and the packing to maintain constant pressure on the packing notwithstanding flow of the packing material, the arrangement according to the invention is not spring-loaded, so that flow of the material of packing washer 34 and/or of the valve packing material 32 may sharply reduce the pressure exerted by the screw. The seal is maintained by the flowed position of the material of the packing washer 34 and the material of valve packing 32.

The spray gun may be disassembled for cleaning by removing the rotary drive coupling 68, and unscrewing packing tightness nut 38. A forcing screw (not illustrated) is threaded into threaded aperture 959 in the rear of mixing chamber insert 50, and tension is applied, to pull valve and tip piece 40 free of its conical seat with the tapered valve packing 32. Mixing chamber insert 50 will not pull out of valve and tip piece 40 during this operation, because screw 66 keeps it in place. With the assembly of the valve and tip piece 40 and the mixing chamber insert 50 free of the body, it may be further disassembled by removing screw 66 from the assembly, and again applying tension to the forcing screw, this time between the forcing screw and the rear of valve and tip piece 40, to thereby pull mixing chamber insert 50 out of the valve and tip piece 40. The disassembled pieces can then be soaked in solvent and cleaned, and then reassembled in reverse order, all without damaging or affecting the seal provided by tapered packing 32. The packing washer can be re-used because, although it is distorted by use, it will re-conform to the valve and tip piece and to body 1.

A useful aspect of the invention is that a number of different valve and tip pieces 40 and mixing chamber inserts 50 may be kept on hand, so that different flow rates and mixing characteristics can be easily and quickly accommodated. Retorquing the valve into the packing re-conforms the packing to produce a tight seal.

The support and control arrangement of FIG. 1a may simultaneously begin motion of spray gun support 128, turn on ratio-controlled pump 131 to cause flow of reactants to the reactant ports of the spray gun 10, and rotate coupling 68 of FIG. 2 into position to allow the reactants to be dispensed. Alternatively, these actions may be made in a timed sequence as required. Turn-off may be simultaneous, in a timed sequence which is the reverse of the turn-on timed sequence, or it may be a different sequence. As noted above, turn-off of the spray gun valve simultaneously purges the valve. The purge gas tends to flow through both the direct orifices and the auxiliary path during a time when the material has just begun to react, so the purging tends to be effective.

Other embodiments of the invention will be apparent to those skilled in the art. For example, materials other than tetrafluoroethylene may be used for the valve bearing or packing, and the reinforcement, if used, may be of a material other than graphite fiber. While embodiments with two purge ports have been illustrated, a single purge port may suffice. While bearing surface 522 in FIG. 5b has been illustrated and described as being flat, it could have any number of shapes, including concave, convex, or complex. If there is a tendency to accumulate foam adjacent the exterior of the nozzle, a device equivalent to a nylon-string weed remover can be operated against the exterior of the nozzle to flick off the foam as it appears. A single purge port may be used, as illustrated in FIG. 9, instead of two purge ports, as illustrated in FIG. 2.

What is claimed is:

1. A foam spray device for spraying multicomponent foam in response to a flow, under pressure, of first and second reactant fluids from ratio-controlled sources of said first and second reactant fluids, and for purging in response to a flow, under pressure, of purging gas from a gas source, said device comprising:

a body with a cavity defining a principal axis of said body, and also defining first and second reactant fluid inlet ports adapted to be connected to said sources for receiving said first and second reactant fluids, respectively, said first and second reactant fluid inlet ports intersecting said cavity, and being centered on a second axis which is transverse to, and intersects, said principal axis, said body further defining at least a first purge port adapted to be connected to said gas source, said first purge port intersecting said cavity, and being centered on a third axis which is transverse to, and intersects, both said principal and second axes, said cavity extending through said body from an assembly insertion aperture at a first end thereof to a front aperture at a second end thereof, whereby said second and third axes together define a port plane in which said ports lie, said body cavity defining a first inner surface portion in the form of a right circular cylindrical surface which is centered on said principal axis of said body and traversed by said port plane;

a valve bearing of a moldable material in the general shape of a cylindrical annulus, said valve bearing having a right circular cylindrical outer surface centered about a first packing axis, and a cylindrical inner surface which tapers in a particular manner from a first diameter at a front end thereof to a second diameter, larger than said first diameter, at a second end thereof, said valve bearing also defining first and second apertures extending therethrough, coaxial with a second packing axis which is transverse to, and intersects, said first packing axis, and at least a third aperture extending therethrough, coaxial with a third packing axis which is transverse to, and intersects, both said first and second packing axes, said valve bearing being located within said cavity of said body, with said first packing axis centered on said principal axis of said body, with said second diameter portion remote from said front aperture of said cavity, and with said outer surface of said valve bearing contiguous with said first inner surface portion of said body, and with said first, second, and third apertures in said valve bearing lying in said port plane;

a valve and tip piece, said valve and tip piece being centered on a first valve and tip piece axis, said valve and tip piece including a dispensing end and a rotation drive end mutually displaced along said first valve and tip piece axis, and also including a rotational drive attachment at said rotation drive end, said valve and tip piece also defining a longitudinal mixing cavity extending along said first valve and tip piece axis, said valve and tip piece also including a conical portion with an outer surface in the shape of a portion of a cone, said conical portion being centered on said first valve and tip piece axis, said cone tapering from (a) a first diameter adjacent said dispensing end of said valve and tip piece, which first diameter is substantially equal to said first diameter of said cylindrical inner surface of said valve bearing, to (b) a second diameter adjacent said rotation drive end of said valve and tip piece, which second diameter is substantially equal to said second diameter of said cylindrical inner surface of said valve bearing, said conical portion having said particular taper, said valve and tip piece also defining first and second apertures extending therethrough, coaxial with a second valve and tip piece axis which is transverse to, and intersects, said first valve and tip piece axis, said valve and tip piece also including a second portion lying between said rotation drive end and said conical portion, said second portion being in the form of a right circular cylinder centered on said first valve and tip piece axis, with a diameter less than that of said second diameter of said cone, the transition between said first and second portions of said valve and tip piece being made by a bearing surface, said cavity in said valve and tip piece extending from said dispensing end at least to said second valve and tip piece axis, said valve and tip piece being located within said cavity of said body, with said dispensing end protruding from said front aperture of said body, with said rotation drive end accessible from the exterior of said body, and with said first and second apertures in said conical portion lying in said port plane, whereby, in a first rotational position of said valve and tip piece, said first and second apertures in said conical portion align with said first and second ports of said body to provide a path between said first and second ports of said body and said mixing cavity in said valve and tip piece, and in a second rotational position of said valve and tip piece, said first and second apertures in said conical portion misalign with said first and second ports of said body, and at least one of said apertures in said conical portion aligns with said purge port, to provide a path between said purge port and said mixing cavity in said valve and tip portion;

a packing washer of a moldable material, said packing washer having an inner diameter substantially equal to said diameter of said second portion of said valve and tip piece, and having an outer diameter no smaller than said second diameter of said conical portion of said valve and tip piece, said packing washer being located within said cavity in said body, and bearing on said bearing surface of said valve and tip piece; and nonelastic washer compression means including a washer bearing surface and a valve and tip piece clearance aperture, said washer compression means being affixed to said body, with said clearance aperture surrounding said second portion of said valve and tip means, and with said washer bearing surface bearing on said packing washer, for maintaining said packing washer in position by application of pressure thereto, whereby a seal is formed by which the pressure of said sources is prevented from causing flow of said reactant fluids around said packing washer.

2. A device according to claim 1, wherein said particular taper is a linear taper.

3. A device according to claim 1, wherein said nonelastic washer compression means includes interior threads within said cavity in said body, and matching exterior threads on an annular plug.

4. A device according to claim 3, further comprising a thrust washer interposed between said annular plug and said packing washer of a moldable material.

5. A foam spray device for spraying multicomponent foam in response to a flow, under pressure, of first and second reactant fluids from ratio-controlled sources of said first and second reactant fluids, and for purging in response to a flow, under pressure, of purging gas from a gas source, said device comprising:

a body with a cavity defining a principal axis of said body, and also defining first and second reactant fluid inlet ports adapted to be connected to said sources for receiving said first and second reactant fluids, respectively, said first and second reactant fluid inlet ports intersecting said cavity, and being centered on a second axis which is transverse to, and intersects, said principal axis, said body further defining at least a first purge port adapted to be connected to said gas source, said first purge port intersecting said cavity, and being centered on a third axis which is transverse to, and intersects, both said principal and second axes, said cavity extending through said body from an assembly insertion aperture at a first end thereof to a front aperture at a second end thereof, whereby said second and third axes together define a port plane in which said ports lie, said body cavity defining a first inner surface portion in the form of a right circular cylindrical surface which is centered on said principal axis of said body and traversed by said port plane;

a valve bearing of a moldable material in the general shape of a cylindrical annulus, said valve bearing having a right circular cylindrical outer surface centered about a first packing axis, and a cylindrical inner surface which tapers in a particular manner from a first diameter at a front end thereof to a second diameter, larger than said first diameter, at a second end thereof, said valve bearing also defining first and second apertures extending therethrough, coaxial with a second packing axis which is transverse to, and intersects, said first packing axis, and at least a third aperture extending therethrough, coaxial with a third packing axis which is transverse to, and intersects, both said first and second packing axes, said valve bearing being located within said cavity of said body, with said first packing axis centered on said principal axis of said body, with said second diameter portion remote from said front aperture of said cavity, and with said outer surface of said valve bearing contiguous with said first inner surface portion of said body, and with said first, second, and third apertures in said valve bearing lying in said port plane;

a valve and tip piece, said valve and tip piece being centered on a first valve and tip piece axis, said valve and tip piece including a dispensing end and a rotation drive end mutually displaced along said first valve and tip piece axis, and also including a rotational drive attachment at said rotation drive end, said valve and tip piece also defining a longitudinal mixing cavity extending along said first valve and tip piece axis, said valve and tip piece also including a conical portion with an outer surface in the shape of a portion of a cone, said conical portion being centered on said first valve and tip piece axis, said portion of a cone tapering from (a) a first diameter adjacent said dispensing end of said valve and tip piece, which first diameter is substantially equal to said first diameter of said cylindrical inner surface of said valve bearing, to (b) a second diameter adjacent said rotation drive end of said valve and tip piece, which second diameter is substantially equal to said second diameter of said cylindrical inner surface of said valve bearing, said conical portion having said particular taper, said valve and tip piece also defining first and second apertures extending therethrough, coaxial with a second valve and tip piece axis which is transverse to, and intersects, said first valve and tip piece axis, said valve and tip piece also including a second portion bring between said rotation drive end and said conical portion, said second portion being in the form of a right circular cylinder centered on said first valve and tip piece axis, with a diameter less than that of said second diameter of said portion of a cone, the transition between said first and second portions of said valve and tip piece being made by a bearing surface, said cavity in said valve and tip piece extending from said dispensing end at least to said second valve and tip piece axis, said valve and tip piece being located within said cavity of said body, with said dispensing end, protruding from said front aperture of said body, with said rotation drive end accessible from the exterior of said body, and with said first and second apertures in said conical portion lying in said port plane, whereby, in a first rotational position of said valve and tip piece, said first and second apertures in said conical portion align with said first and second ports of said body to provide a path between said first and second ports of said body and said mixing cavity in said valve and tip piece, and in a second rotational position of said valve and tip piece, said first and second apertures in said conical portion misalign with said first and second ports of said body, and at least one of said apertures in said conical portion aligns with said purge port, to provide a path between said purge port and said mixing cavity in said valve and tip portion;

a packing washer of a moldable material, said packing washer having an inner diameter substantially equal to said diameter of said second portion of said valve and tip piece, and having an outer diameter no smaller than said second diameter of said conical portion of said valve and tip piece, said packing washer being located within said cavity in said body, and bearing on said bearing surface of said valve and tip piece;

nonelastic washer compression means including a washer bearing surface and a valve and tip piece clearance aperture, said washer compression means being affixed to said body, with said clearance aperture surrounding said second portion of said valve and tip means, and with said washer bearing surface bearing on said packing washer, for maintaining said packing washer in position by application of pressure thereto, whereby a seal is formed by which the pressure of said sources is prevented from causing flow of said reactant fluids around said packing washer;

said nonelastic washer compression means including interior threads within said cavity in said body, and matching exterior threads on an annular plug;

said device for spraying multicomponent foam further comprising a generally tubular mixing chamber piece defining a cylindrical outer surface with an annular depressed channel, and also defining a longitudinal bore, said mixing chamber piece being located within said mixing cavity in said valve and tip piece, with said annular depressed channel lying in said port plane, said mixing chamber piece further including communication means for interconnecting said annular depressed surface with said longitudinal bore of said mixing chamber piece.

6. A foam spray device for spraying multicomponent foam in response to a flow, under pressure, of first and second reactant fluids from ratio-controlled sources of said first and second reactant fluids, and for purging in response to a flow, under pressure, of purging gas from a gas source, said device comprising:

a body with a cavity defining a principal axis of said body, and also defining first and second reactant fluid inlet ports adapted to be connected to said sources for receiving said first and second reactant fluids, respectively, said first and second reactant fluid inlet ports intersecting said cavity, and being centered on a second axis which is transverse to, and intersects, said principal axis, said body further defining at least a first purge port adapted to be connected to said gas source, said first purge port intersecting said cavity, and being centered on a third axis which is transverse to, and intersects, both said principal and second axes, said cavity extending through said body from an assembly insertion aperture at a first end thereof to a front aperture at a second end thereof, whereby said second and third axes together define a port plane in which said ports lie, said body cavity defining a first inner surface portion in the form of a right circular cylindrical surface which is centered on said principal axis of said body and traversed by said port plane;

a valve bearing of a moldable material in the general shape of a cylindrical annulus, said valve bearing having a right circular cylindrical outer surface centered about a first packing axis, and a cylindrical inner surface which tapers in a particular manner from a first diameter at a front end thereof to a second diameter, larger than said first diameter, at a second end thereof, said valve bearing also defining first and second apertures extending therethrough, coaxial with a second packing axis which is transverse to, and intersects, said first packing axis, and at least a third aperture extending therethrough, coaxial with a third packing axis which is transverse to, and intersects, both said first and second packing axes, said valve bearing being located within said cavity of said body, with said first packing axis centered on said principal axis of said body, with said second diameter portion remote from said front aperture of said cavity, and with said outer surface of said valve bearing contiguous with said first inner surface portion of said body, and with said first, second, and third apertures in said valve bearing lying in said port plane;

a valve and tip piece, said valve and tip piece being centered on a first valve and tip piece axis, said valve and tip piece including a dispensing end and a rotation drive end mutually displaced along said first valve and tip piece axis, and also including a rotational drive attachment at said rotation drive end, said valve and tip piece also defining a longitudinal cavity extending along said first valve and tip piece axis, said valve and tip piece also including a conical portion with an outer surface in the shape of a portion of a cone, said conical portion being centered on said first valve and tip piece axis, said cone tapering from (a) a first diameter adjacent said dispensing end of said valve and tip piece, which first diameter is substantially equal to said first diameter of said cylindrical inner surface of said valve bearing, to (b) a second diameter adjacent said rotation drive end of said valve and tip piece, which second diameter is substantially equal to said second diameter of said cylindrical inner surface of said valve bearing, said conical portion having said particular taper, said valve and tip piece also defining first and second apertures extending therethrough, coaxial with a second valve and tip piece axis which is transverse to, and intersects, said first valve and tip piece axis, said valve and tip piece also including a second portion lying between said rotation drive end and said conical portion, said second portion being in the form of a right circular cylinder centered on said first valve and tip piece axis, with a diameter less than that of said second diameter of said cone, the transition between said first and second portions of said valve and tip piece being made by a bearing surface, said cavity in said valve and tip piece extending from said dispensing end at least to said second valve and tip piece axis, said valve and tip piece being located within said cavity of said body, with said dispensing end protruding from said front aperture of said body, with said rotation drive end protruding from said assembly insertion aperture of said body, and with said first and second apertures in said conical portion lying in said port plane, whereby, in a first rotational position of said valve and tip piece, said first and second apertures in said conical portion align with said first and second ports of said body to provide a path between said first and second ports of said body and said cavity in said valve and tip piece, and in a second rotational position of said valve and tip piece, said first and second apertures in said conical portion misalign with said first and second ports of said body, and at least one of said apertures in said conical portion aligns with said purge port, to provide a path between said purge port and said cavity in said valve and tip portion;

a packing washer of a moldable material, said packing washer having an inner diameter substantially equal to said diameter of said second portion of said valve and tip piece, and having an outer diameter no smaller than said second diameter of said conical portion of said valve and tip piece, said packing washer being located within said cavity in said body, and bearing on said bearing surface of said valve and tip piece;

nonelastic washer compression means including a washer bearing surface and a valve and tip piece clearance aperture, said washer compression means being affixed to said body, with said clearance aperture surrounding said second portion of said valve and tip means, and with said washer bearing surface bearing on said packing washer, for maintaining said packing washer in position by application of pressure thereto, whereby a seal is formed by which the pressure of said sources is prevented from causing flow of said reactant fluids around said packing washer; and a generally tubular mixing chamber piece defining a cylindrical outer surface with an annular depressed channel, and also defining a longitudinal bore, said mixing chamber piece being located within said cavity in said valve and tip piece, with said annular depressed channel lying in said port plane, said mixing chamber piece further including communication means for interconnecting said annular depressed surface with said longitudinal bore of said mixing chamber piece.

* * * * *